UNITED STATES PATENT OFFICE.

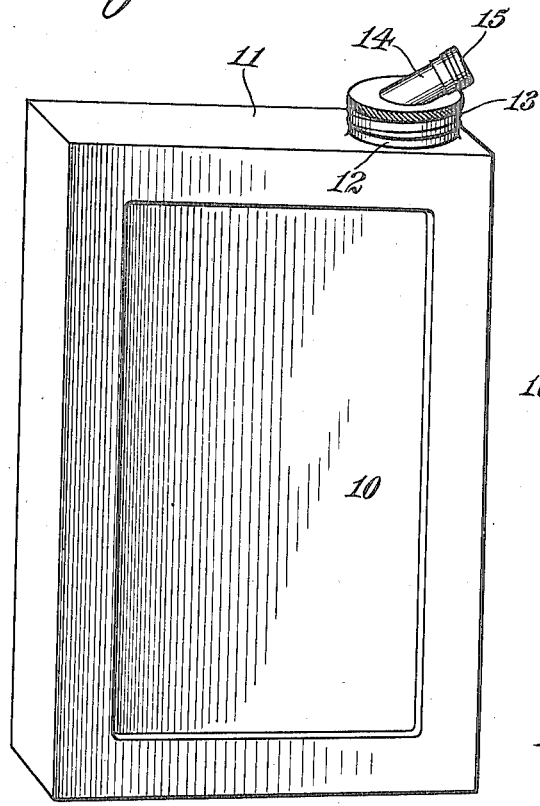
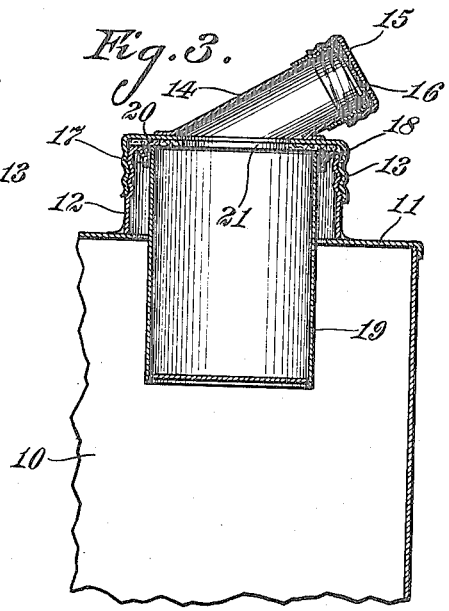
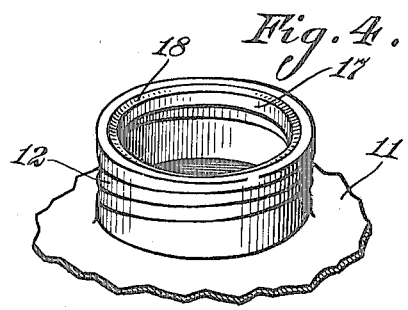
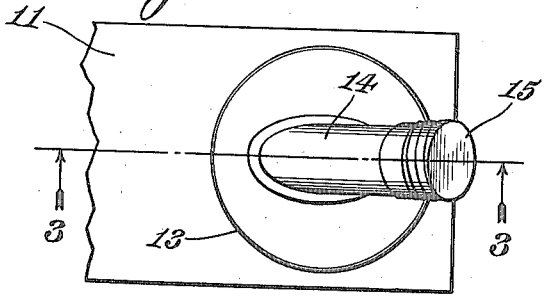
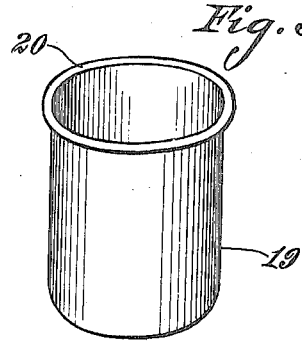

EDWARD STERNS, OF ST. LOUIS, MISSOURI, ASSIGNOR, BY MESNE ASSIGNMENTS, TO EFFICIENCY OIL CORPORATION, OF ST. LOUIS, MISSOURI, A CORPORATION OF DELAWARE.

MEASURING DEVICE FOR CONTAINERS.

1,213,918.   Specification of Letters Patent.   Patented Jan. 30, 1917.

Application filed May 6, 1915. Serial No. 26,406.

*To all whom it may concern:*

Be it known that I, EDWARD STERNS, a citizen of the United States, and residing at St. Louis, in the State of Missouri, have invented a certain new and useful Improvement in Measuring Devices for Containers, of which the following is a specification.

This invention relates to containers, and more particularly, to measuring devices therefor.

In the use of some liquids it is desirable to measure out a predetermined amount. This has generally been accomplished in two ways; first, by an ordinary measure; and, second, by a measuring device forming an integral part of the container. In the first case, however, the measuring device is liable to be lost, while in the second case the device is too complicated and expensive to be placed on ordinary containers in which articles are sold with the container.

One of the objects of this invention, therefore, is to provide a container which has a measuring cup adapted to be placed in and retained by the container, and adapted to be used for measuring out the contents from the container.

Further objects will appear from the detail description taken in connection with the accompanying drawing, in which:

Figure 1 is a perspective view of a container embodying this invention; Fig. 2 is a plan of Fig. 1; Fig. 3 is a section on the line 3—3, Fig. 2; Fig. 4 is a detail perspective view of the container and its nipple; and, Fig. 5 is a detail perspective of the measuring cup.

Referring to the accompanying drawing, 10 designates a container, which may be of any suitable construction. The top 11 is provided with an outlet surrounded by a nipple 12 soldered to or formed as a part of the top of the container. The end of this nipple is threaded to coöperate with the threaded flange of a closure 13. This closure is perforated and has formed thereon a spout 14 closed by a cap 15, which is threaded on the spout, a suitable washer 16, of cork or other material, being interposed to form a tight joint.

The end of the nipple is flanged inwardly, as shown at 17, and this flanged part is formed to provide a seat 18 sunk slightly below the top of the nipple. The measuring cup 19 is of a size so as to be insertible through the closure, and the open end of this cup is flanged or beaded, as shown at 20, so as to rest on the seat 18. The closure 13 may be provided with a suitable washer 21, of cork or any other suitable material.

Normally the cup 19 is suspended in the container, as shown in Fig. 3, and this cup will then be retained in position by the closure. If it is now desired to measure out a part of the contents of the container, the closure is removed from the nipple, the cup lifted out, the closure replaced, and the contents poured into the measuring cup through the spout 14 from which the cap 15 has been removed. After the desired amount has been measured out, the cup is replaced. If desirable, the cup can be filled before it is replaced, so that a filled cup will be in position, as shown in Fig. 3. If it is now desired to pour out a certain measured quantity, this quantity can be poured out through the spout 14 by removing the cap 15. This practice is convenient where only a single measure is to be poured out, say once a day, and where the cup can be filled after the measured quantity has been poured out.

It will thus be seen that the invention accomplishes its objects. The measuring device is convenient and simple. The cup cannot become lost or misplaced, since it forms a part of the container. The washer 21 forms a tight joint between the closure, cup and nipple, so that the contents of the container will not leak out, even though the container is inverted. The additional cost over the ordinary container is so small that it can practically be neglected, so that this device furnishes a cheap, as well as convenient means.

It is obvious that various changes may be made in the details of construction without departing from the spirit of this invention. It is, therefore, to be understood that this invention is not to be limited to the specific construction shown and described.

I am aware that it is old, as disclosed by Letters Patent 275,697 and 1,047,681, to provide a canteen with a drinking cup normally arranged within the canteen and removable therefrom for use. I am also aware that it is old, as shown in Letters Patent 229,805, to provide an oil can with a discharge spout. I am not aware, however, that it is old to combine with a container, having such a discharge spout, a measuring cup normally disposed within the container and constructed and arranged for its contents to be discharged through said spout. Therefore, I lay no claim to either of these features alone, but do claim as my invention their combination in a container; whereby a measured quantity of material may be held within the cup in readiness to be discharged.

Having thus described the invention, what is claimed is—

1. A container having an outlet, a measuring cup normally positioned in said container for removal through said outlet, and a closure for the outlet adapted to retain the cup in place, said closure having a pouring spout.

2. A container having an outlet, a measuring cup normally positioned in said container and having its open end toward the outlet, and a closure for said outlet adapted to retain the cup in place and having a spout constructed and arranged to open into said cup.

3. A container having an outlet, a measuring cup adapted to be positioned in said outlet, and a closure adapted to retain said cup in position and form a tight joint between the container, cup and closure, said closure having a spout arranged to open into said cup.

4. A container having an outlet, a closure having a pouring spout, and a measuring cup between said closure and said outlet and adapted to form a sealing member.

In testimony whereof I affix my signature this 28th day of April, 1915.

EDWARD STERNS.